(12) United States Patent
Kularatna et al.

(10) Patent No.: US 12,143,135 B2
(45) Date of Patent: Nov. 12, 2024

(54) ESTIMATING DELAYS

(71) Applicant: NOKIA SOLUTIONS AND NETWORKS OY, Espoo (FI)

(72) Inventors: Shavantha Kularatna, Flower Mound, TX (US); Ramasamy Gopalan, Irving, TX (US); Yared Melese, Irving, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 389 days.

(21) Appl. No.: 17/768,777

(22) PCT Filed: Oct. 22, 2019

(86) PCT No.: PCT/US2019/057333
§ 371 (c)(1),
(2) Date: Apr. 13, 2022

(87) PCT Pub. No.: WO2021/080566
PCT Pub. Date: Apr. 29, 2021

(65) Prior Publication Data
US 2023/0142639 A1 May 11, 2023

(51) Int. Cl.
*H04B 1/12* (2006.01)
*H04B 1/10* (2006.01)

(52) U.S. Cl.
CPC ........... *H04B 1/123* (2013.01); *H04B 1/1027* (2013.01)

(58) Field of Classification Search
CPC ........ H04B 1/10; H04B 1/1027; H04B 1/109; H04B 1/12; H04B 1/123; H04B 1/16
See application file for complete search history.

(56) References Cited

U.S. PATENT DOCUMENTS 8,249,540 B1 * 8/2012 Gupta ..................... H04B 1/10
455/305
9,768,812 B1 9/2017 Tsui
(Continued)

FOREIGN PATENT DOCUMENTS

CN 103475429 A 12/2013
CN 104471862 A 3/2015
(Continued)

OTHER PUBLICATIONS

1st Office Action and Search Report, CN201980101575.3, Dec. 6, 2023, 6 pages.
(Continued)

*Primary Examiner* — Quochien B Vuong
(74) *Attorney, Agent, or Firm* — Tong, Rea, Bentley & Kim, LLC

(57) ABSTRACT

A method, apparatus and computer program product is disclosed. The apparatus may comprise means for providing a model for a system for mitigating unwanted effects in a received signal and a means for determining a first curve, $a_{corr}$, by performing autocorrelation of the model. The apparatus may also comprise means for determining a second curve, $Xcorr_{env}$, by performing cross-correlation of the model and a received signal comprising unwanted components due to first and second sources and means for estimating first and second delays associated with respective first and second sources based on the first and second curves, $a_{corr}$, $Xcorr_{env}$. The unwanted effects in the received signal may be PIM products/components, but the disclosure is not limited to PIM alone, and embodiments may be used to mitigate or compute peaks in any interfering scenario where peaks may be hidden.

20 Claims, 5 Drawing Sheets

(56) References Cited

U.S. PATENT DOCUMENTS

| | | | |
|---|---|---|---|
| 10,237,109 B2* | 3/2019 | Wilson | H04B 1/123 |
| 10,243,593 B2* | 3/2019 | Pipon | H04B 1/1081 |
| 11,664,837 B2* | 5/2023 | Poberezhskiy | H04B 1/12 |
| | | | 455/296 |
| 2006/0235635 A1 | 10/2006 | Intrator | |
| 2011/0216851 A1 | 9/2011 | Mujica | |
| 2011/0227582 A1 | 9/2011 | Ahamed et al. | |
| 2013/0310090 A1 | 11/2013 | Bevan | |
| 2017/0222858 A1 | 8/2017 | Wilson et al. | |
| 2017/0343660 A1 | 11/2017 | Wang | |
| 2018/0248576 A1 | 8/2018 | Coe | |

FOREIGN PATENT DOCUMENTS

| | | |
|---|---|---|
| CN | 106461719 A | 2/2017 |
| CN | 107 453 782 A | 12/2017 |
| CN | 107666361 A | 2/2018 |
| EP | 2930854 A1 | 10/2015 |
| EP | 3 035 063 A1 | 6/2016 |
| GB | 1418494.9 A | 4/2016 |
| WO | 2019011422 A1 | 1/2019 |

OTHER PUBLICATIONS

Communication under Rule 71(3), Intention to Grant, EP 19801171.0, Dec. 15, 2023, 30 pages.

International Search Report and Written Opinion mailed in PCT/US2019/057333 on Jul. 6, 2020, 12 pages.

* cited by examiner

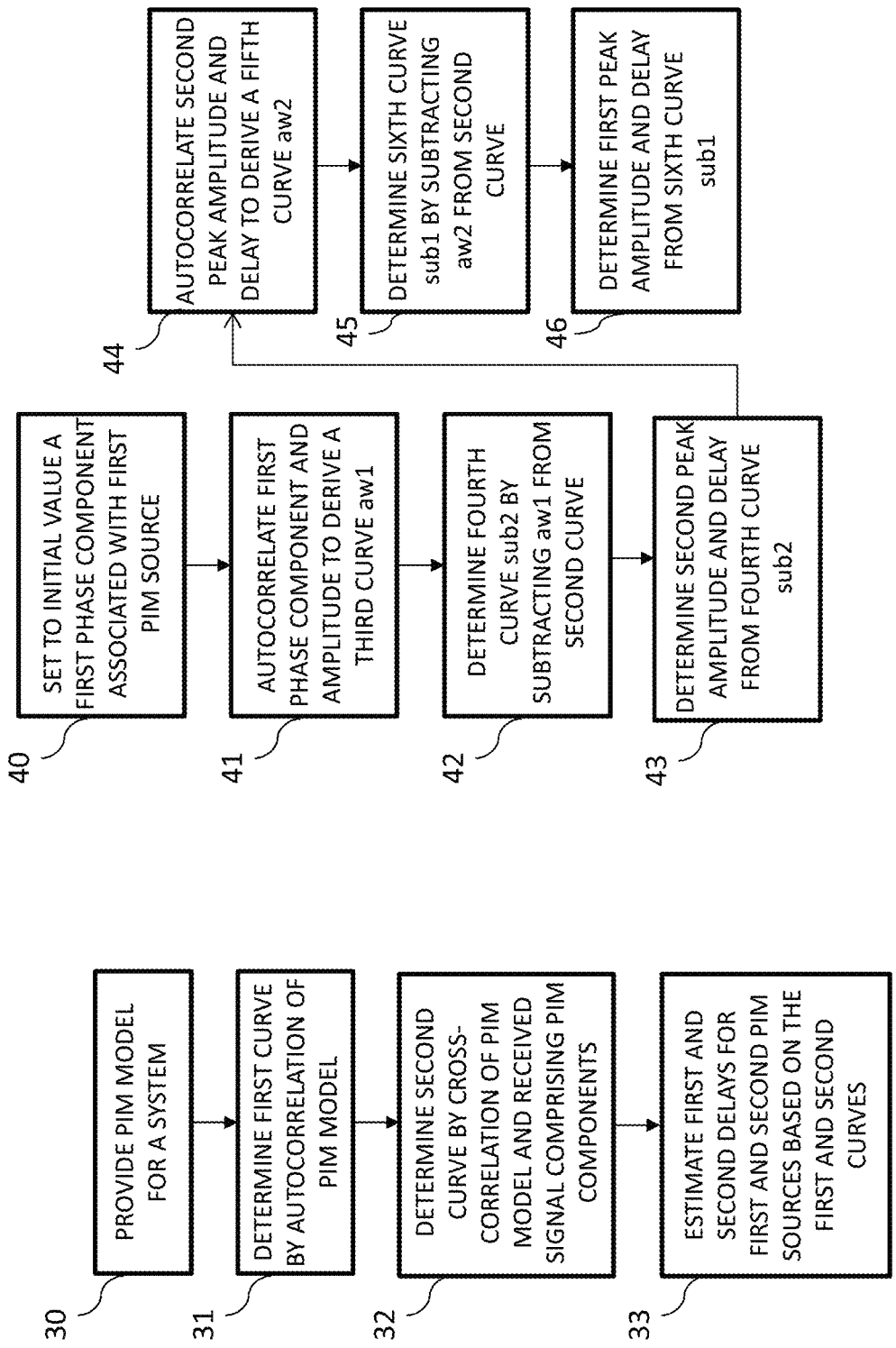

ESTIMATING DELAYS

CROSS-REFERENCE TO RELATED APPLICATIONS

This application is based on and claims the benefit of International Patent Application No. PCT/US2019/057333, filed on Oct. 22, 2019, which is hereby incorporated herein by reference in its entirety.

FIELD

This specification relates to an apparatus, method and computer program product relating to estimating a delay, for example for, but not limited to, estimating hidden delays for, by way of example only, alignment in Passive InterModulation (PIM) cancellation.

BACKGROUND

Passive InterModulation (PIM) is a well-known telecom issue. It is caused if plural signals are transmitted through a non-linear system. A non-linear system may be a system comprising active components, but it may also occur in passive components, e.g. due to corroded connectors etc. Due to PIM, intermodulation products occur at frequencies f corresponding to $k_a f_a + k_b f_b + k_c f_c + \ldots$, wherein $f_a, f_b, f_c, \ldots$ are the frequencies of the plural signals, and $k_a, k_b, k_c, \ldots$ are integer coefficients (positive, negative, or 0). The sum $k_a + k_b + k_c + , \ldots$ is denoted as the order of the intermodulation product, denoted as IMP3, IMP5, IMP7 etc. for IMP of $3^{rd}$, $5^{th}$, and $7^{th}$ order, respectively. The amplitude of the IMPs decreases with increasing order of the IMPs. IMP3 is typically most relevant because it is located close to the input signal and has relatively high amplitude. If a broadband signal is transmitted through the non-linear system, PIM may cause the occurrence of side-lobes.

PIM Cancellation (PIMC) techniques are used to mitigate the effects of PIM. This may involve providing a model of the PIM and using it in a PIMC algorithm to perform said mitigation.

SUMMARY

The scope of protection sought for various embodiments of the invention is set out by the independent claims. The embodiments and features, if any, described in this specification that do not fall under the scope of the independent claims are to be interpreted as examples useful for understanding various embodiments of the invention.

According to one aspect, there may be provided an apparatus, comprising means for: providing a model for a system for mitigating unwanted effects in a received signal; determining a first curve, $a_{corr}$, by performing autocorrelation of the model; determining a second curve, $Xcorr_{env}$, by performing cross-correlation of the model and a received signal comprising unwanted components due to first and second sources; and estimating first and second delays associated with respective first and second sources based on the first and second curves, $a_{corr}$, $Xcorr_{env}$.

The apparatus may further comprise means for aligning the model to each of the first and second delays for mitigating the unwanted components.

The model may be a passive intermodulation model, $PIM_{model}$, and wherein the unwanted components are due to first and second PIM sources $PIM_1$, $PIM_2$, in the system.

The estimating means may further estimate the amplitudes of the first and second sources and wherein the first and second delays are based on the respective time-domain locations of the peak amplitudes.

The estimating means may be configured to determine the peak amplitudes and delays of the first and second sources by the process of: setting to an initial value a first phase component for association with the first source; performing autocorrelation of the first phase component and amplitude to derive a third curve, $aw_1$, associated with the first source; determining a fourth curve $sub_2$ by subtracting the third curve, $aw_1$, from the second curve, $Xcorr_{env}$; determining the second peak amplitude and delay from the fourth curve $sub_2$; performing autocorrelation of the determined second peak amplitude and delay to derive a fifth curve $aw_2$; determining a sixth curve sub1 by subtracting the fifth curve aw2 from the second curve Xcorrenv; and determining the first peak amplitude and delay from the sixth curve sub1.

The process may be repeated i times using the first delay determined from the sixth curve sub1. i may be user-configurable and may be at least ten.

The apparatus may be remote from the system for mitigating unwanted effects in a received signal.

The received signal may be received from a remote radio system, and the apparatus may comprise means for transmitting the first and second delays to a PIMC system at the remote radio system or adapting the PIM model for sending to the remote radio system.

The system may be an RF system, e.g. a base station.

According to another aspect, there may be provided a method, comprising: providing a model for a system for mitigating unwanted effects in a received signal; determining a first curve, $a_{corr}$, by performing autocorrelation of the model; determining a second curve, $Xcorr_{env}$, by performing cross-correlation of the model and a received signal comprising unwanted components due to first and second sources; and estimating first and second delays associated with respective first and second sources based on the first and second curves, $a_{corr}$, $Xcorr_{env}$.

The method may further comprise aligning the model to each of the first and second delays for mitigating the unwanted components.

The model may be a passive intermodulation model, $PIM_{model}$, and wherein the unwanted components may be due to first and second PIM sources $PIM_1$, $PIM_2$, in the system.

The estimating may comprise estimating the amplitudes of the first and second sources and wherein the first and second delays are based on the respective time-domain locations of the peak amplitudes.

The estimating may determine the peak amplitudes and delays of the first and second sources by the process of: setting to an initial value a first phase component for association with the first source; performing autocorrelation of the first phase component and amplitude to derive a third curve, $aw_1$, associated with the first source; determining a fourth curve $sub_2$ by subtracting the third curve, $aw_1$, from the second curve, $Xcorr_{env}$; determining the second peak amplitude and delay from the fourth curve $sub_2$; performing autocorrelation of the determined second peak amplitude and delay to derive a fifth curve aw2; determining a sixth curve sub1 by subtracting the fifth curve aw2 from the second curve Xcorrenv; and determining the first peak amplitude and delay from the sixth curve sub1.

The process may be repeated i times using the first delay determined from the sixth curve sub1. i may be user-configurable and may be at least ten.

The process may be performed at an apparatus remote from the system for mitigating unwanted effects in a received signal.

The received signal may be received from a remote radio system, and the method may further comprise transmitting the first and second delays to a PIMC system at the remote radio system or adapting the PIM model for sending to the remote radio system.

The method may be performed at, or applied to, an RF system, e.g. a base station.

According to another aspect, there may be provided a work product comprising a look up table or array, created by means of the method of: providing a model for a system for mitigating unwanted effects in a received signal; determining a first curve, $a_{corr}$, by performing autocorrelation of the model; determining a second curve, $Xcorr_{env}$, by performing cross-correlation of the model and a received signal comprising unwanted components due to first and second sources; and estimating first and second delays associated with respective first and second sources based on the first and second curves, $a_{corr}$, $Xcorr_{env}$.

According to another aspect, there may be provided non-transitory computer readable medium comprising program instructions stored thereon for performing a method, comprising: providing a model for a system for mitigating unwanted effects in a received signal; determining a first curve, $a_{corr}$, by performing autocorrelation of the model; determining a second curve, $Xcorr_{env}$, by performing cross-correlation of the model and a received signal comprising unwanted components due to first and second sources; and estimating first and second delays associated with respective first and second sources based on the first and second curves, $a_{corr}$, $Xcorr_{env}$.

According to another aspect, there may be provided an apparatus comprising: at least one processor; and at least one memory including computer program code which, when executed by the at least one processor, causes the apparatus: to provide a model for a system for mitigating unwanted effects in a received signal; to determine a first curve, $a_{corr}$, by performing autocorrelation of the model; to determine a second curve, $Xcorr_{env}$, by performing cross-correlation of the model and a received signal comprising unwanted components due to first and second sources; and to estimate first and second delays associated with respective first and second sources based on the first and second curves, $a_{corr}$, $Xcorr_{env}$.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 2 is a flow diagram of processing operations that may be performed in accordance with some example embodiments;

FIG. 3 is a more detailed flow diagram of processing operations that may be performed in accordance with some example embodiments;

DETAILED DESCRIPTION

Figure 1:
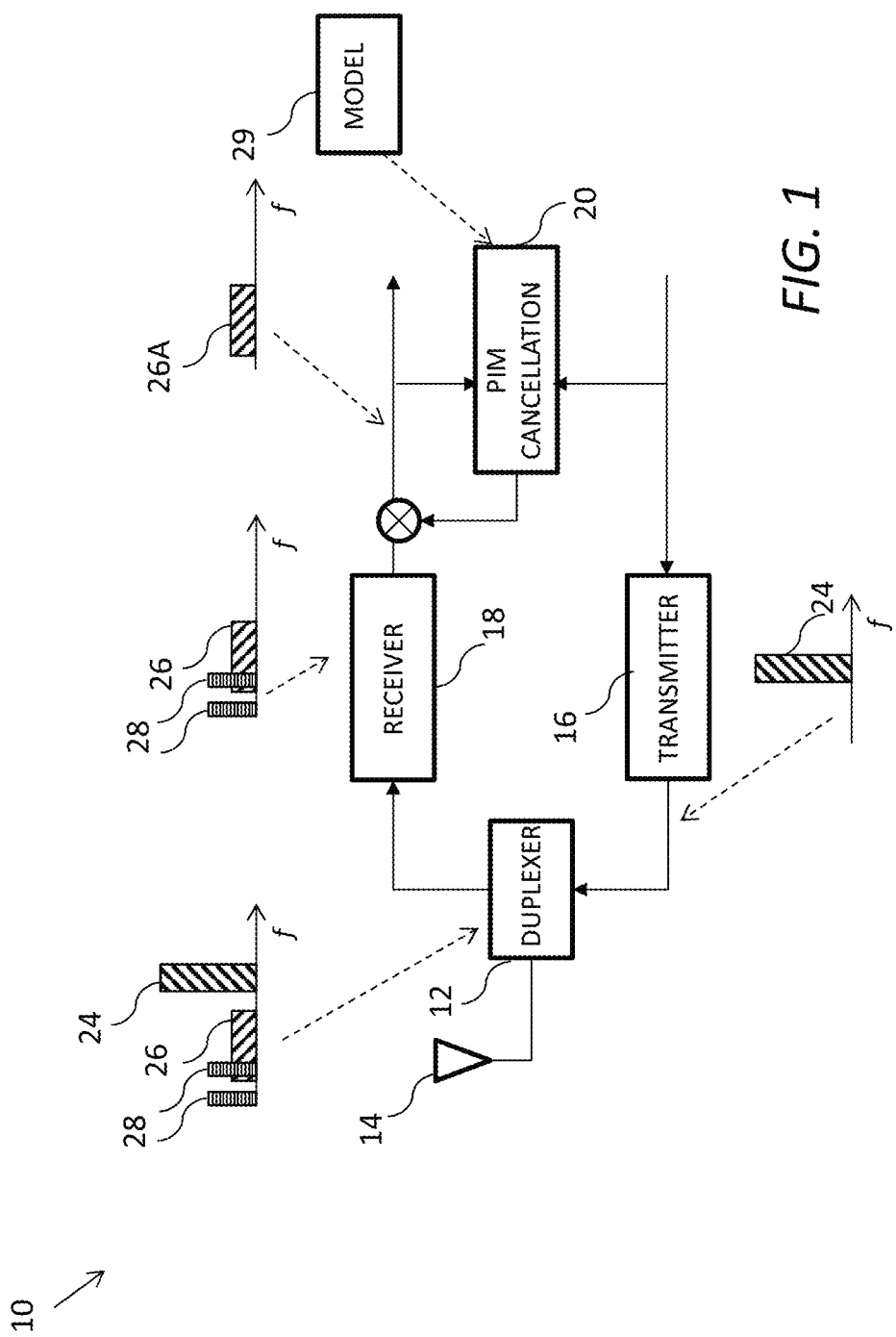
FIG. 1 is a block diagram of a transceiver system employing PIM cancellation, which may be in accordance with some example embodiments.

Certain example embodiments are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting to the disclosed details.

Moreover, it is to be understood that the apparatus is configured to perform the corresponding method, although in some cases only the apparatus or only the method are described. The operations of the method may be embodied in a computer program product on, for example, a non-transitory medium.

Certain abbreviations will be used herein, which are set out below for ease of reference.

Abbreviations

2G/3G/4G/5G $2^{nd}/3^{rd}/4^{th}/5^{th}$ Generation
3GPP $3^{rd}$ Generation Partnership Project
CD Compact Disc
DVD Digital Versatile Disk
eNB, Evolved or Enhanced NodeB
gNB Next-Generation NodeB
IMP/IM Intermodulation Product
IMP3/IMP5/ . . . IMP of $3^{rd}$ order/$5^{th}$ order/ . . .
LMS Least Mean Square
MIMO Multiple Input-Multiple Output
MMS Minimum Mean Square
MSE Mean Squared Error
NB NodeB or base station
NL Non-linear
PIM Passive Intermodulation
PIMC Passive Intermodulation Cancellation
RMS Recursive Mean Square
RF Radio Frequency
RX Receive
SNR Signal to Noise Ratio
TX Transmit
UE User Equipment
UI User Interface
USB Universal Serial Bus
WiFi Wireless Fidelity As mentioned in the background, Passive InterModulation (PIM) is a well-known telecom issue. Example embodiments therefore focus on PIM as an example of an unwanted effect that presents itself in a received or reflected signal, but the same principles can be applied to other sectors involving mitigating unwanted effects using a model, wherein it would be advantageous to re-align where within the received signal the model is to be applied. Example embodiments are therefore applicable to sectors such as medical, energy, and defense sectors, as well as in radio communications.

For example, cellular base stations, and/or other radio equipment may de-sense their own uplink owing to PIM products, for example introduced by passive components such as duplexers, cables, connector interfaces, antennas etc. If PIM is not mitigated, e.g. reduced or cancelled, it may not be possible to decode received signals. Operators may use PIM testers during site visits to measure PIM for mitigation purposes. In some embodiments, operators may model PIM without the need for measurement and/or use PIMC algorithms to improve uplink signal quality.

PIM may be caused by ageing physical components, or PIM sources, that create PIM products that correspond to receive frequencies causing a receiver's SNR to degrade, resulting possibly in significant uplink losses. There may be more than one PIM source producing PIM products in a real system. It may be important for the PIMC algorithm to have a more accurate estimation of the delay (equivalently, distance or time) of each of the PIM sources. A greater distance between different PIM sources at a given sampling rate makes it easier to estimate the delay between said PIM sources owing to there being clearly separated and distinct peaks appearing in a resulting correlation curve. A simple peak search operation on the correlation curve can indicate an accurate location of the different PIM sources and enable PIMC to be applied to each location.

Example embodiments relate to an apparatus, method and computer-program product for accurately estimating one or more delays due to multiple sources, e.g. PIM sources in a radio system. If the distance between the sources gets relatively small, the multiple peaks corresponding to each source on the correlation curve effectively collapse or merge into a single composite peak, meaning that the individual peaks are effectively hidden. The composite correlation curve is a function of both the location and amplitude of peaks and accurate estimation of the individual peaks can be very challenging, especially in a real-time scenario such as in PIMC where accuracy and speed is a factor.

Example embodiments herein also enable to estimate accurately the one or more delays without the need for taking the system being measured off-line. In other words, some example embodiments allow for estimating the delay in real time during normal operations of, for example, a base station (e.g. NB, eNB or gNB) using the regular transmitted signal and not a dedicated PIM test signal which would disrupt service. This overcomes issues due to the PIM varying over time, e.g. due to the slow natural degradation of the antenna system resulting from constant exposure to the elements. For example, as the antenna begins to rust over time, its PIM performance naturally degrades. This degradation cannot be picked up by a one-time measurement.

Some embodiments enable the delay estimation to be performed remotely, e.g. at a server or central network management system remote from the one or more antenna systems under test. PIM measurements may be used for PIM cancellation or mitigation purposes and/or for quality control purposes.

As mentioned, PIM is a natural process where transmit signals generate intermodulation products in passive devices. PIM products may be generated at very low power levels, for example due to the aging of antennas, corroded or loose connectors and duplex filters that are passive. Imperfections of cables, combiners and attenuators may also generate PIM. PIM generation with transmit signals is generally harmless due to its low level. However, when PIM products line up with receive signals, issues can arise. Although the level of PIM in a typical radios can range from −110 dBc to −150 dBc (w.r.t to the transmit signal) it can cause the receiver to desensitize. As an example, a transmit signal that is 49 dBm of power causes PIM levels that are −81 dBm to −101 dBm. Hence, on some occasions, PIM signals can be higher than the receive signals. When PIM is higher than the receive signal, the receiver decoding process will fail due to negative signal to noise ratio. This may cause a significant throughput loss in the uplink direction (mobile to base station).

Some radios or associated equipment are designed to mitigate, i.e. reduce or avoid, such PIM effects with PIMC algorithms. A PIMC algorithm estimates PIM by comparing the transmit (Tx) and the receive (Rx) signal path. The PIM cancellation algorithm may then build up a model that attempts to cancel, or at least reduce, the PIM products on the receive (Rx) signal. The model is a mathematically-derived model that provides, or can be utilised to provide, one or more non-linear signals for use in the correction. The PIMC algorithm may involve performing a delay search to align the model (i.e. the non-linear signal(s)) with the observed received signal containing PIM. If the received signal comprises PIM components from two or more relatively close PIM sources, alignment needs to take account of the individual PIM correlation curves that are within the observed composite curve. The composite curve is a correlation curve that is effectively an envelope of the multiple curves, including multiple peaks for each PIM source, and thus lower amplitude peaks may be hidden. Even the main peak index may be entirely hidden. With an inaccurate delay search, alignment of the PIM model in the PIMC algorithm cannot be accurate and the performance of the PIMC algorithm degrades. It is possible that delay errors can introduce spurious signals instead of mitigating PIM and hence the received signal can be degraded further.

Example embodiments provide an apparatus, method and/or computer-program product for more accurate estimating of two or more delays due to respective PIM sources, even if said PIM sources are physically close together in the radio system under test. This enables improved PIMC.

Example embodiments provide the following notations.

$pim_{model}$ a mathematical model of a PIM source with IM3 and IM5 terms. Any known PIM model is applicable, although an example derivation of a $pim_{model}$ is described below.

$w_1$, $w_2$ Complex numbers representing amplitude and phase (delay) of first and second PIM sources PIM1, PIM2.

$\otimes$ Correlation operator.

Auto-correlation of the modelled PIM is given by:

$$acorr = pim_{model} \otimes pim_{model} \quad (1)$$

First and second PIM sources can be modelled as follows:

$$pim_1 = pim_{model} \cdot w_1 \quad (2)$$

$$pim_2 = pim_{model} \cdot w_2 \quad (3)$$

An envelope or composite correlation curve can be expressed as:

$$xcorr_{env} = pim_{model} \otimes (pim_1 + pim_2) \quad (4)$$

Expanding (4) and substituting (1), (2), (3) into an expanded equation provides:

$$xcorr_{env} = acorr \cdot (w_1 + w_2) \quad (5)$$

In an example embodiment, $xcorr_{env}$ and acorr may be obtained from equation (5) because acorr can be evaluated from the $pim_{model}$, and $xcorr_{env}$ can be obtained from a delay search operation i.e., by performing cross-correlation of the $pim_{model}$ and observed received signal containing the actual physical PIM.

Example embodiments may involve estimating the complex numbers $w_1$, $w_2$ so that the location of the first and second PIM sources $PIM_1$, $PIM_2$ can be known accurately given $xcorr_{env}$ and acorr as inputs.

Example embodiments may provide an apparatus, method and/or computer-program product for determining a passive intermodulation model, $PIM_{model}$, for a system, i.e. a radio system or part of a radio system, determining a first curve, $a_{corr}$, by performing autocorrelation of the passive intermodulation model, and determining a second curve, $Xcorr_{env}$, by performing cross-correlation of the passive intermodulation model and a received signal comprising passive intermodulation components due to two or more passive intermodulation sources $PIM_1$, $PIM_2$. The apparatus, method and/or computer program product may estimate first and second delays associated with respective first and second passive intermodulation sources based on the first and second curves, $a_{corr}$, $Xcorr_{env}$.

The term "curve" is merely indicative that the $PIM_{model}$ may be a time-domain model, although computations disclosed herein can be performed in the frequency domain, and, as such, the computations can be resolved to data points indicative of a curve from which characteristics such as the peak amplitude and phase or delay can be derived. Terminology used in the claims may be interpreted accordingly.

The term "delay" may be considered synonymous with time, timing or offset.

The apparatus, method and/or computer-program product may further align the passive intermodulation model, $PIM_{model}$, i.e. the non-linear signal(s) to each of the first and second delays for mitigating passive intermodulation.

The estimating may further estimate the amplitudes of the first and second passive intermodulation sources, $PIM_1$, $PIM_2$, and the first and second delays are based on the respective time-domain locations of the peak amplitudes.

FIG. 1 is a schematic diagram of an example transceiver system 10 that involves PIM cancellation according to example embodiments. As mentioned, example embodiments are not limited to such a system. The transceiver system 10 comprises a duplexer 12 connected to a common antenna 14; the duplexer 12 comprises first and second duplexer filters, a first being a transmitter (Tx) duplexer filter having a passband providing a signal path between a transmitter (Tx) 16 and the antenna, and the second being a receiver (Rx) duplexer filter providing a signal path between the antenna and a receiver (Rx) 18. No path between the transmitter 16 and the receiver 18 should exist.

A PIM cancellation module 20 may be provided between the input and output paths of the transmitter 16 and receiver 18 respectively. The PIM cancellation module 20 may be implemented in hardware, software or a combination thereof. The PIM cancellation module 20 operates using a PIMC algorithm similar to known PIM cancellation algorithms. For example, a PIM model 29 may be determined or provided in accordance with embodiments to be explained below. The net effect of the PIMC algorithm employed by the PIM cancellation module 20 is to provide improved or optimal PIM cancellation at the received signal. FIG. 1 also indicates example spectra including a transmission band 24, transmission and receive bands 24, 26 including PIM components 28 at the duplexer 12, the receive band 26 and PIM components 28 at the receiver 18, and the desired "cleaned" receive band 26A after PIMC by the PIM cancellation module 20.

Figure 4:
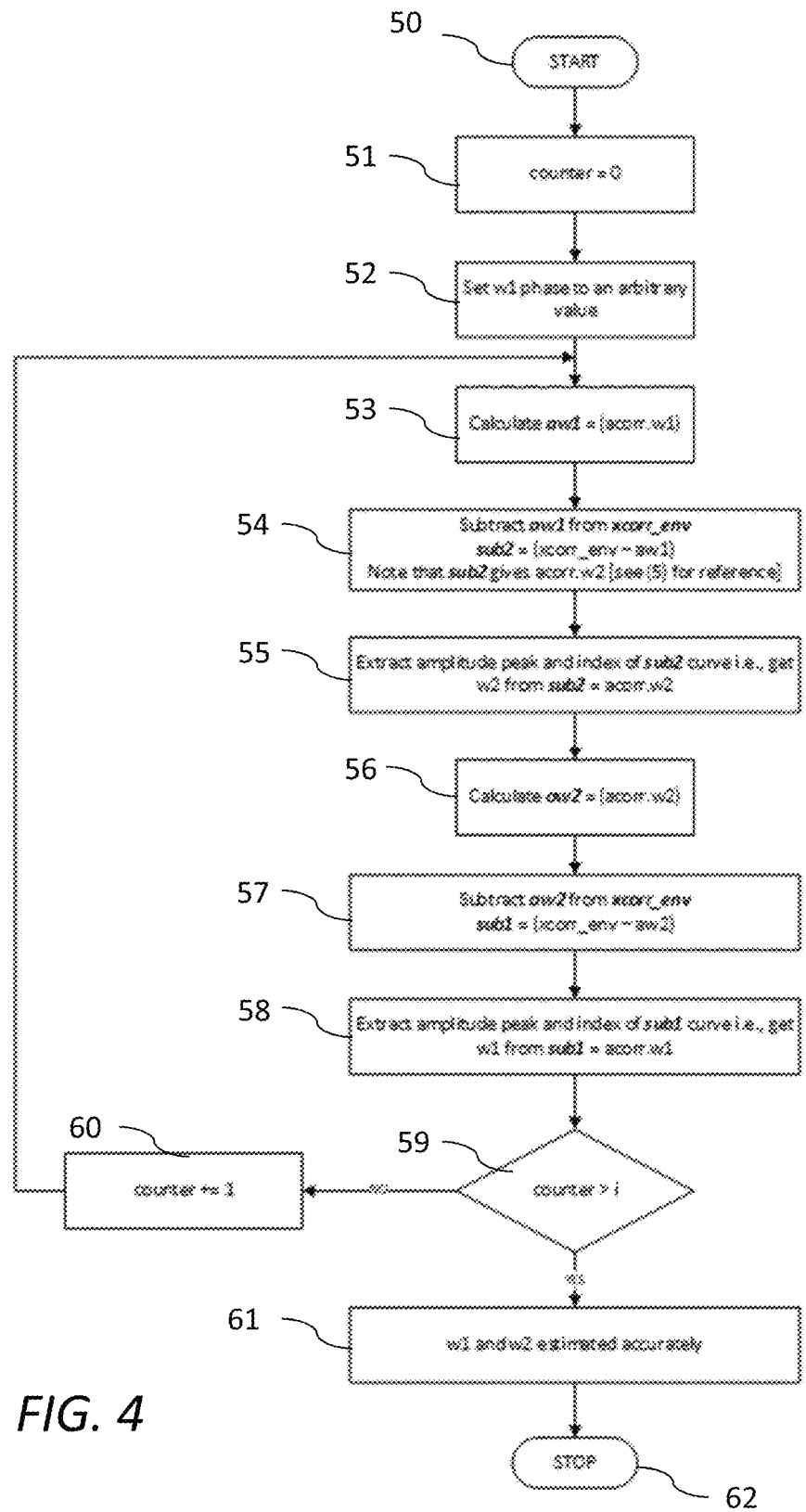
FIG. 4 is a more detailed flow diagram of processing operations that may be performed in accordance with some example embodiments.

The PIM cancellation module 20 may be configured to perform the operations indicated in the flow diagrams of FIGS. 2, 3 and 4.

Referring to FIG. 2, a first operation 30 may comprise providing a PIM model. As mentioned, this can be any PIM model but an example of how to derive a PIM model for a given system is described below. Reference is also made to PCT US2018/062443, PCT US2018/038262, PCT US2018/037292, and PCT US2019/041980, the entire contents of which are incorporated by reference. A second operation 31 may comprise determining a first curve by autocorrelation of the PIM model according to equation (1).

A third operation 32 may comprising determining a second curve, $xcorr_{env}$, by cross-correlation of the $PIM_{model}$ and a received signal comprising two or more PIM components, e.g. third-order PIM components, associated with respective PIM sources, e.g. $PIM_1$, $PIM_2$.

A fourth operation 33 may comprise estimating first and second delays for the respective first and second PIM sources $PIM_1$, $PIM_2$ based on the first and second curves.

Referring to FIG. 3, another flow diagram provides an example process for performing the fourth operation 33.

A first operation 40 may comprise setting to an initial (e.g. arbitrary) value a first phase component associated with a first PIM source $PIM_1$.

A second operation 41 may comprise autocorrelating the first phase component and amplitude to derive a third curve, which we will denote as aw1.

A third operation 42 may comprise determining a fourth curve sub2 by subtracting the third curve aw1 from the second curve, $xcorr_{env}$, i.e. that determined in the third operation 32 in FIG. 2.

A fourth operation 43 may comprise determining a second peak amplitude and delay (for the second PIM source, $PIM_2$) from the fourth curve sub2.

A fifth operation 44 may comprise autocorrelating the second peak amplitude and delay to derive a fifth curve, which we will denote as aw2.

A sixth operation 45 may comprise determining a sixth curve sub1 by subtracting the fifth curve aw2 from the second curve $xcorr_{env}$.

A seventh operation 46 may comprise determining the first peak amplitude and delay of the first PIM source $PIM_1$ using the sixth curve sub1.

Thus, it is understood how the values of $w_1$ (the complex number representing the amplitude and phase of first PIM source, $PIM_1$) and $w_2$ (the complex number representing the amplitude and phase of second PIM source, $PIM_2$) can be estimated. Thus, the computation can determine offsets to apply for alignment of the PIM model, $PIM_{model}$, to perform PIMC in a received signal comprising PIM from two or more PIM sources, even if relatively close to one another.

The above operations may be repeated using the determined peaks and phases for a predetermined number of iterations, e.g. ten or more, before converging on final estimates of $w_1$ and $w_2$ for use in alignment of the $PIM_{model}$.

Referring to FIG. 4, a more detailed flow diagram is shown indicating another example embodiment which employs an iterative scheme to refine the computed values of $w_1$, $w_2$.

Reference numeral 50 indicates a start condition.

A first operation 51 may comprise setting a counter to zero or some other reference number.

A second operation 52 may comprise setting a phase value to be associated with a first PIM source, PIM1, i.e. the phase part of the complex number, w1, to an arbitrary initial value.

A third operation 53 may comprise calculating aw1 using autocorrelation of w1 determined in the second operation 52.

A fourth operation 54 may comprise subtracting aw1 from $xcorr_{env}$ to compute sub2, noting that sub2=($xcorr_{env}$–aw1).

A fifth operation 55 may comprise extracting the amplitude peak and the index of the sub2 curve, i.e. to get w2 from sub2, which is the autocorrelation of w2.

A sixth operation 56 may comprise calculating aw2.

A seventh operation 57 may comprise subtracting aw2 from $xcorr_{env}$.

An eighth operation 58 may comprise extracting the amplitude peak and index of the sub1 curve, i.e. to get w1 from sub1, which is the autocorrelation of w1.

A ninth operation 59 may comprise determining if the counter value is greater than a predetermined threshold i. For example, i may be a user-configurable integer, e.g. ten.

If i is not exceeded, the method may proceed to a tenth operation 60 which increments the counter and returns to the third operation 53. If i is exceeded, the method may conclude in an eleventh operation 61 that the values of w1 and w2 have been accurately estimated.

Reference numeral 62 indicates a stop condition.

As with other embodiments, the estimation of w1 and w2 indicates the delays or offsets to apply the $PIM_{model}$.

It will be appreciated that certain operations in FIGS. 2-4 may be modified or omitted. Further operations may be involved. The numbering of operations is not necessarily indicative of the order of processing. Features from each of FIGS. 2-4 may be combined and/or interchanged.

Figure 5:
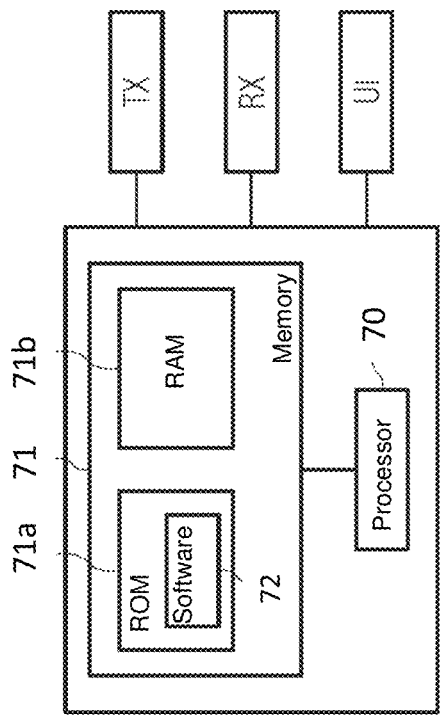
FIG. 5 is a block diagram of an apparatus that may perform processing operations described herein.

FIG. 5 shows an apparatus according to an embodiment. The apparatus may provide the functional modules indicated in any of FIGS. 2-4. The apparatus comprises at least one processor 70 and at least one memory 71 directly or closely connected to the processor. The memory 71 includes at least one random access memory (RAM) 71b and at least one read-only memory (ROM) 71a. Computer program code (software) 72 is stored in the ROM 71a. The apparatus may be connected to a transmitter path and a receiver path of a base station in order to obtain the respective signals. However, in some embodiments, the transmitter signals and receiver signals are input as data streams into the apparatus. The apparatus may be connected with a user interface, UI, for instructing the apparatus and/or for outputting the results (e.g. the estimated delay). However, instead of by a UI, the instructions may be input e.g. from a batch file, and the output may be stored in a non-volatile memory. The at least one processor 70, with the at least one memory 71 and the computer program code 72 are arranged to cause the apparatus to at least perform at least the method according to any of FIGS. 2-4.

The determined delays may be provided from the FIG. 5 apparatus to a local or remote location, such as a radio system, e.g. a cellular base station. The determination and provision may be performed periodically. The FIG. 5 apparatus may therefore be, in some embodiments, any apparatus that may be remote from the system that performs PIMC, the apparatus determining, storing and sending the determined delays, e.g. as a work product of the process described herein, to the PIMC system over a communications network. For example, the FIG. 5 apparatus may be a computer, e.g. a server or possibly a mobile handset. The FIG. 5 apparatus may be provided in an Operation & Maintenance Center or an element thereof such as a delay estimating unit, which may also be used for storing the delay data for quality control purposes. Thus, estimating of said delays may be performed remotely from the system under test and remedial action controlled remotely and in real-time without the need to take said system offline.

Figure 6:
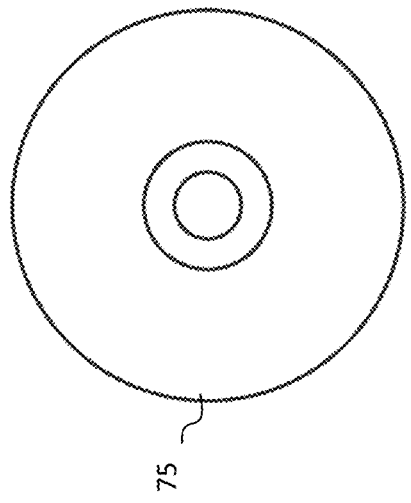
FIG. 6 is a plan view of a non-transitory computer-readable medium for storing data which, when processed, may perform processing operations described herein.

FIG. 6 shows a non-transitory media 75 according to some embodiments. The non-transitory media 75 is a computer readable storage medium. It may be e.g. a CD, a DVD, a USB stick, a blue ray disk, etc. The non-transitory media 75 stores computer program code causing an apparatus to perform the method of any of FIGS. 2-4 when executed by a processor, such as processor 70 of FIG. 5.

Figure 7:
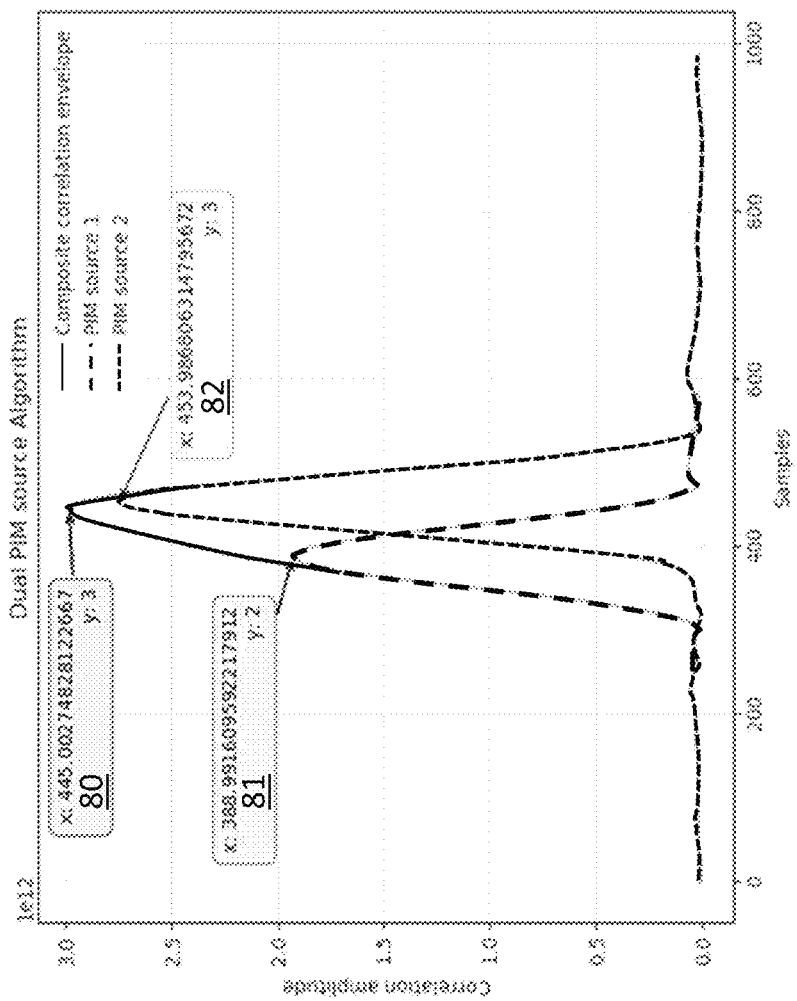
FIG. 7 is a graph showing a composite correlation envelope and first and second envelopes that may be derived out of the composite envelope in accordance with example embodiments described herein.

FIG. 7 is a graph indicating results from a test scenario performed on a 17 m physical cable, with a two-way length therefore of 34 m, and with a velocity factor of 0.84. First and second PIM sources, $PIM_1$, $PIM_2$, were placed at each end of the cable. The sample rate used was 491.52 Msps and the difference between the first and second PIM sources, $PIM_1$, $PIM_2$, was 66 samples.

It can be seen that a simple peak search would reveal a main peak 80 with an amplitude of approximately 3, at sample position 445. However, using the algorithm described above, respective peaks 81, 82 associated with the first and second PIM sources $PIM_1$, $PIM_2$ were identified at sample positions 454 and 388, thereby enabling re-alignment of the $PIM_{model}$.

To produce said estimates, approximately ten iterations of the FIG. 4 method were used (i=10) but the number may be varied. A statistically correct delay can always be reached, and can be optimized, e.g. using added data sets, based on the environment where the PIM problem occurs.

Example embodiments are particularly useful in LTE 5 MHz applications, but may be used in other applications also, including outside of radio, as already mentioned above.

Filter Modelling

As mentioned above, example embodiments are useful for estimating hidden delays for methods and systems involving mitigating unwanted effects using a model, PIMC being given as a particular embodiment. PIMC may use any known PIM model, however derived. We here describe one way of deriving a PIM model in software.

An example PIM model is:

$$PIM\_Signal = Alpha*Tx\_Signal*|Tx\_Signal|^2 + Beta*Tx\_Signal*|Tx\_Signal|^4$$

PIM_Signal denotes the signal resulting from PIM, Tx_Signal denotes the input signal to be transmitted through the non-linear system, and Alpha and Beta are complex coefficients scaling the IMP3 contribution $Tx\_Signal*|Tx\_Signal|^2$ and the IMP5 contribution $Tx\_Signal*|Tx\_Signal|^4$, respectively.

Other models may depend on only one order of IMP, or may comprise higher order IMPs or terms that are not linear in the IMP contributions. The model (i.e., the coefficients of the model; in the above model: Alpha and Beta) may be refined using a Least Mean Square or any other error limiting algorithm like MMS (Minimum Mean Square), RLS (Recursive Least Square) algorithms. As the model becomes sufficiently accurate, the model may be used to estimate what would be the result of the two tone tests as defined in IEC 62037. That is, the two tones of the IEC 62037 measurement are used as Tx-Signal in the model, and the resulting PIM_signal is used to calculate the PIM value as a quotient of the power of the PIM_signal and 20 W.

The PIM value can then be used in a PIMC algorithm to prevent loss of decoding capability.

The frequencies of the two tones may be selected according to the RF system for which the PIM value is to be estimated. For example, for a DCS base station, the tones are selected out of the Tx band between 1800 and 1880 MHz, and the Rx signal is measured in the uplink band between 1710 and 1785 MHz. In one example, the two tones have frequencies of 1805 MHz and 1875 MHz and 20 Watts each. The PIM product is then at 1735 MHz. Typically, PIM varies slowly with the frequency such that a single measurement (estimation) may be sufficient in many cases.

The power of 20 W is at the carrier level (dBc), not the total transmitted power. For example, in the above described case, one may measure (estimate) a level of −110 dBm. Thus, the ratio compared to the 20 Watts carrier (43 dBm) is −110 dBm−43 dBm=−153 dBc.

This means, according to some embodiments, the model is trained with the regular traffic transmitted by the non-linear system and the PIM value may be estimated in real time using the model thereby virtually duplicating the results which would have been performed using the two-tone signal tests.

The non-linear system may be presented to e.g. a base station of an arbitrary radio access technology (e.g. 2G, 3G, 4G, or 5G of 3GPP, WiFi, or Bluetooth) or a corresponding terminal such as a UE.

Names of network elements, protocols, and methods are based on current standards. In other versions or other technologies, the names of these network elements and/or protocols and/or methods may be different, as long as they provide a corresponding functionality. For example, embodiments may be deployed in 2G/3G/4G/5G networks and further generations of 3GPP but also in non-3GPP radio networks such as WiFi. Accordingly, a base station may be a BTS, a NodeB, a eNodeB, a WiFi access point etc.

A memory may be volatile or non-volatile. It may be e.g. a RAM, a sram, a flash memory, a FPGA block ram, a DCD, a CD, a USB stick, and a blue ray disk.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments provide, for example, a delay estimation device for PIM cancellation, or a component thereof, an apparatus embodying the same, a method for controlling and/or operating the same, and computer program(s) controlling and/or operating the same as well as mediums carrying such computer program(s) and forming computer program product(s). Such a delay estimation device for PIM cancellation may be incorporated e.g. in a Nokia Airframe expandable base station.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Some embodiments may be implemented in the cloud.

It is to be understood that what is described above is what is presently considered the preferred embodiments. However, it should be noted that the description of the preferred embodiments is given by way of example only and that various modifications may be made without departing from the scope as defined by the appended claims.

The invention claimed is:

1. An apparatus, comprising:
at least one processor; and
at least one memory including computer program code;
wherein the at least one memory and the computer program code are configured to, with the at least one processor, cause the apparatus at least to perform:
providing a model for a system for mitigating unwanted effects in a received signal;
determining a first curve by performing autocorrelation of the model;
determining a second curve by performing cross-correlation of the model and a received signal comprising unwanted components due to first and second sources; and
estimating first and second delays associated with the respective first and second sources based on the first and second curves.

2. The apparatus of claim 1, wherein the at least one memory and the computer program code are configured to, with the at least one processor, cause the apparatus at least to perform:
aligning the model to each of the first and second delays for mitigating the unwanted components.

3. The apparatus of claim 1, wherein the model is a passive intermodulation model (PIM) and the first and second sources are PIM sources.

4. The apparatus of claim 1, wherein the at least one memory and the computer program code are configured to, with the at least one processor, cause the apparatus at least to perform:
estimating amplitudes of the first and second sources, wherein the first and second delays are based on respective time-domain locations of first and second peak amplitudes of the first and second sources.

5. The apparatus of claim 4, wherein the at least one memory and the computer program code are configured to, with the at least one processor, cause the apparatus at least to perform:
determining the first and second peak amplitudes and the first and second delays of the first and second sources by a process including:
setting to an initial value a first phase component for association with the first source;
performing autocorrelation of the first phase component and the amplitude of the first source to derive a third curve associated with the first source;
determining a fourth curve by subtracting the third curve from the second curve;
determining the second peak amplitude and the second delay of the second source from the fourth curve;
performing autocorrelation of the second peak amplitude and the second delay of the second source to derive a fifth curve;
determining a sixth curve by subtracting the fifth curve from the second curve; and
determining the first peak amplitude and the first delay of the first source from the sixth curve.

6. The apparatus of claim 5, wherein the process is repeated i times using the first delay of the first source.

7. The apparatus of claim 6, wherein i is user-configurable.

8. The apparatus of claim 6, wherein i is at least ten.

9. The apparatus of claim 1, wherein the apparatus is remote from the system for mitigating unwanted effects in a received signal.

10. The apparatus of claim 9, wherein the received signal is received from a remote radio system.

11. The apparatus of claim 10, wherein the at least one memory and the computer program code are configured to, with the at least one processor, cause the apparatus at least to perform:
transmitting the first and second delays of the first and second sources to a passive intermodulation model cancellation (PIMC) system at the remote radio system.

12. The apparatus of claim 10, wherein the at least one memory and the computer program code are configured to, with the at least one processor, cause the apparatus at least to perform:
adapting the model for sending to the remote radio system.

13. The apparatus of claim 1, wherein the system is a radio frequency (RF) system.

14. The apparatus of claim 13, wherein the RF system is a base station.

15. A non-transitory computer-readable storage medium storing computer program code configured to cause an apparatus at least to perform:
providing a model for a system for mitigating unwanted effects in a received signal;
determining a first curve by performing autocorrelation of the model;
determining a second curve by performing cross-correlation of the model and a received signal comprising unwanted components due to first and second sources; and
estimating first and second delays associated with the respective first and second sources based on the first and second curves.

16. The non-transitory computer-readable medium of claim 15, wherein the computer program code is configured to cause the apparatus to perform:
aligning the model to each of the first and second delays for mitigating the unwanted components.

17. The non-transitory computer-readable medium of claim 15, wherein the model is a passive intermodulation model (PIM) and the first and second sources are PIM sources.

18. A method, comprising:
providing a model for a system for mitigating unwanted effects in a received signal;
determining a first curve by performing autocorrelation of the model;
determining a second curve by performing cross-correlation of the model and a received signal comprising unwanted components due to first and second sources; and
estimating first and second delays associated with the respective first and second sources based on the first and second curves.

19. The method of claim 18, further comprising:
aligning the model to each of the first and second delays for mitigating the unwanted components.

20. The method of claim 18, wherein the model is a passive intermodulation model (PIM) and the first and second sources are PIM sources.

* * * * *